(12) United States Patent
Lebouthillier (10) Patent No.: US 11,511,692 B2
(45) Date of Patent: Nov. 29, 2022

(54) ATTACHMENT DEVICE FOR MOUNTING ACCESSORIES TO AN UTILITY TERRAIN VEHICLE, AND ACCESSORIES MOUNTABLE THERETO

(71) Applicant: Daniel Lebouthillier, Neguac (CA)

(72) Inventor: Daniel Lebouthillier, Neguac (CA)

(*) Notice: Subject to any disclaimer, the term of this patent is extended or adjusted under 35 U.S.C. 154(b) by 53 days.

(21) Appl. No.: 17/300,072

(22) Filed: Mar. 2, 2021

(65) Prior Publication Data

US 2021/0309174 A1    Oct. 7, 2021

Related U.S. Application Data

(60) Provisional application No. 63/100,817, filed on Apr. 3, 2020.

(51) Int. Cl.
  *B60R 19/48*   (2006.01)
  *B60R 19/38*   (2006.01)

(52) U.S. Cl.
  CPC .............. *B60R 19/48* (2013.01); *B60R 19/38* (2013.01)

(58) Field of Classification Search
  CPC ......... B60R 19/48; B60R 19/24; B60R 19/38; B60R 9/06; B62D 49/065
  USPC .......... 296/187.11, 116, 117; 280/760, 416.1
  See application file for complete search history.

(56) References Cited

U.S. PATENT DOCUMENTS

| | | |
|---|---|---|
| 1,208,204 A | 12/1916 | Poimiroo et al. |
| 2,890,076 A | 6/1959 | Baechler |
| 3,008,251 A | 11/1961 | Cline et al. |
| 3,332,562 A | 7/1967 | Kokott |
| 3,578,358 A * | 5/1971 | Reynolds .................. B60D 1/01 280/495 |
| 3,598,186 A | 8/1971 | Coontz |
| 3,800,447 A | 4/1974 | Harvey |
| 3,913,963 A | 10/1975 | Persicke |
| 4,026,590 A | 5/1977 | Holm |
| 4,369,590 A | 1/1983 | Miller |
| 4,403,432 A | 9/1983 | Biance |
| 4,514,002 A | 4/1985 | McIntosh |
| 4,907,357 A | 3/1990 | Lilienthal |
| 5,046,271 A | 9/1991 | Daniels |
| 5,058,295 A | 10/1991 | Holland |
| 5,209,307 A | 5/1993 | Hotte |
| 5,265,355 A | 11/1993 | Daniels |
| 5,423,394 A | 6/1995 | Kendle |
| 5,520,428 A | 5/1996 | Bell |

(Continued)

*Primary Examiner* — D Glenn Dayoan
*Assistant Examiner* — Kevin P Weldon
(74) *Attorney, Agent, or Firm* — Mario Theriault (57) ABSTRACT

An attachment device is mounted to a utility terrain vehicle for supporting a working accessory to the utility terrain vehicle. The attachment device has a saddle formed therein straddling the trailer hitch receiver tube of the utility terrain vehicle, and a pair of adapter brackets mounted thereto on respective side of the saddle. The adapter brackets are configured for mounting to the rear suspension posts of the vehicle and to the pivot bolts of the upper and lower control arms of the rear suspension of the vehicle. The attachment device reinforces the connection of the hitch receiver tube to the chassis of the vehicle. Any torsion stress applied to the attachment device is transmitted directly to the suspension of the vehicle, whereby a rolling of the vehicle is a direct indication of the torsion applied to the vehicle by the accessory being used.

20 Claims, 11 Drawing Sheets

(56) References Cited

U.S. PATENT DOCUMENTS

| | | | |
|---|---|---|---|
| 5,746,275 A | 5/1998 | Cross et al. | |
| 5,930,922 A | 8/1999 | Altheide | |
| 6,257,347 B1 | 7/2001 | Campisi | |
| 6,461,095 B1 * | 10/2002 | Puska | B66F 9/06 414/917 |
| 6,964,121 B2 | 11/2005 | Harris | |
| 7,059,955 B2 | 6/2006 | Green et al. | |
| 7,300,238 B1 * | 11/2007 | James | B60P 1/5471 414/543 |
| 7,334,713 B1 * | 2/2008 | Turner | B60R 9/00 224/401 |
| 7,611,320 B2 | 11/2009 | Bell | |
| 7,784,199 B2 | 8/2010 | Schmeichel | |
| 7,845,622 B1 | 12/2010 | Riggs | |
| 7,878,484 B2 | 2/2011 | Kitchens, Sr. | |
| 8,322,964 B2 | 12/2012 | O'Brien | |
| 8,656,615 B1 | 2/2014 | Fournier et al. | |
| 8,997,908 B2 | 4/2015 | Kinsman et al. | |
| 9,347,199 B2 | 5/2016 | Gendron et al. | |
| 9,387,790 B2 | 7/2016 | Seales | |
| 10,486,578 B2 * | 11/2019 | Thompson | B60R 9/042 |
| 10,538,196 B2 | 1/2020 | Centerbar | |
| 2003/0140527 A1 | 7/2003 | Pariseau | |
| 2007/0075513 A1 * | 4/2007 | Caron | B60G 21/05 280/124.171 |
| 2007/0196199 A1 * | 8/2007 | Evans | B60P 1/4407 414/466 |
| 2007/0272421 A1 * | 11/2007 | Elliott | A01B 59/064 172/445.1 |
| 2008/0222925 A1 * | 9/2008 | Belzile | A01B 59/06 37/231 |
| 2009/0162168 A1 * | 6/2009 | Fast | B60R 9/06 414/24.5 |
| 2010/0200822 A1 * | 8/2010 | Kitchens, Sr. | B66C 23/701 254/326 |
| 2014/0144861 A1 | 5/2014 | Davis | |

\* cited by examiner

ATTACHMENT DEVICE FOR MOUNTING ACCESSORIES TO AN UTILITY TERRAIN VEHICLE, AND ACCESSORIES MOUNTABLE THERETO

This patent application claims the benefit of U.S. Provisional Application No. 63/100,817, filed Apr. 3, 2020.

FIELD OF THE INVENTION

The present attachment device pertains to the mounting of accessories and implements to an utility terrain vehicle (UTV), and more particularly, it pertains to the attachment of a trail grading implement and other utility accessories to the frame of a utility terrain vehicle with least effect to the integrity of the vehicle.

BACKGROUND OF THE INVENTION

Utility terrain vehicles (UTV) are often used for leisure along unpaved forest trails. These nature rides are more pleasant when the trail has been groomed. Therefore, there is a need to periodically groom these trails with a truck or a tractor equipped with a scraper blade, for example, to even out ruts and to fill pot holes. This reality has created a need for an UTV equipped with a scraper blade capable of smoothen the trails to assist the trail-grooming contractor. When the scrapper blade is not used, however, it is preferable to raise it as to serve as a bumper.

Vehicle bumpers that are convertible to a scraper blade are not new. Several such implements have been found in the prior art. The following first group of prior art documents describe convertible bumpers/scraper blades.
U.S. Pat. No. 1,208,204 issued to Poimiroo et al., on Dec. 12, 1916;
U.S. Pat. No. 2,890,076 issued to R. C. Baechler on Jun. 9, 1959;
U.S. Pat. No. 3,332,562 issued to I. T. Kokott on Jul. 25, 1967;
U.S. Pat. No. 3,913,963 issued to G. Persicke on Oct. 21, 1975;
U.S. Pat. No. 4,026,590 issued to A. F. Holm on May 31, 1977;
U.S. Pat. No. 4,514,002 issued to D. S. McIntosh on Apr. 30, 1985;
U.S. Pat. No. 5,520,428 issued to F. G. Bell on May 28, 1996;

In a second group of documents found in the prior art, there have been found some documents describing scraper blades mounted to front and back of non-tractor vehicles.
U.S. Pat. No. 3,008,251 issued to F. B. Cline et al., on Nov. 14, 1961;
U.S. Pat. No. 3,800,447 issued to E. D. Harvey on Apr. 2, 1974;
U.S. Pat. No. 4,369,590 issued to M. E. Miller on Jan. 25, 1983;
U.S. Pat. No. 4,403,432 issued to M. P. Biance on Sep. 13,1983;
U.S. Pat. No. 4,907,357 issued to S. C. Lilienthal on Mar. 13, 1990;
U.S. Pat. No. 5,046,271 issued to G. J. Daniels on Sep. 10, 1991;
U.S. Pat. No. 5,058,295 issued to W. H. Holland on Oct. 22, 1991;
U.S. Pat. No. 5,209,307 issued to J. F Hotte on May 11, 1993;
U.S. Pat. No. 5,930,922 issued to C. E. Altheide on Aug. 3, 1999;
U.S. Pat. No. 7,784,199 issued to C. M. Schmeichel on Aug. 31, 2010;
U.S. Pat. No. 9,347,199 issued to J. P. Gendron et al. on May 24, 2016;
U.S. Pat. No. 10,538,196 issued to B. L. Centerbar on Jan. 21, 2020.

A third group of documents from the prior art is presented herein below to illustrate and to describe analogous accessories for attachment to all terrain vehicles (ATV) and utility terrain vehicles (UTV).
U.S. Pat. No. 5,746,275 issued to G. Cross et al., on May 5, 1998;
U.S. Pat. No. 6,257,347 issued to R. M. Campisi on Jul. 10, 2001;
U.S. Pat. No. 6,964,121 issued to G. Harris on Nov. 15, 2005;
U.S. Pat. No. 7,059,955 issued to J. W. Green et al., on Jun. 13, 2006;
U.S. Pat. No. 7,611,320 issued to S. D. Bell on Nov. 3, 2009;
U.S. Pat. No. 7,845,622 issued to A. Riggs on Dec. 7, 2010;
U.S. Pat. No. 7,878,484 issued to J. L. Kitchens, Sr. On Feb. 1, 2011;
U.S. Pat. No. 7,997,015 issued to L. Belzile et al., on Aug. 16, 2011;
U.S. Pat. No. 8,322,964 issued to G. M. O'Brien on Dec. 4, 2012;
U.S. Pat. No. 8,656,615 issued to E. Fournier et al., on Feb. 25, 2014;
U.S. Pat. No. 8,997,908 issued to A. Kinsman et al., on Apr. 7, 2015;
U.S. Pat. No. 9,387,790 issued to P. Seales on Jul. 12, 2016;
US Patent Appl. 2003/0140527 filed by C. Pariseau on Jan. 25, 2002;
US Patent Appl. 2014/0144861 filed by M. Davis on Nov. 19, 2013;

As can be seen in the prior art, a number of implements mountable to an UTV are made to be anchored to the rear axle of the vehicle, when the vehicle has a solid axle; to the roll bar of the vehicle or to the cargo box of the vehicle. The mounting of these implements to an UTV requires extensive work, mechanical skills and some modifications to the structure of the vehicle. Some installations described in the prior art are mounted to vehicle elements that are not designed to support these accessories. Therefore, these installations are not always recommended by the vehicle manufacturer.

Other implements are mounted to the trailer hitch receiver tube of the vehicle. Such mounting is preferred as trailer hitch accessories are well known and requires no special skill and no modification to the structure of the vehicle.

A trailer hitch receiver tube is normally attached to the lower portion of the chassis of the vehicle to resist horizontal pulling and pushing and relatively small bending stresses in both a vertical plane, and a horizontal plane. For example, a maximum tongue weight is posted on the hitch receiver tube as a maximum loading not to be exceeded. Generally, there is minimum or no special requirement for designing a trailer hitch structure to resist torsion stresses, or large vertical bending stresses. Therefore, it is believed that the unexpected bending strain on a hitch bar in the vertical or horizontal plane, or in a torsion mode, is not recommended. It is believed that the mounting of a crane mast for example, or a non-floating scrapper blade, to the trailer hitch of an UTV without a proper attachment device can eventually cause damage to the frame of the vehicle.

For this reason, basically, it is believed that there is a market need for a better mounting of implements to the rear end of an UTV to absorb stresses applied to the vehicle. There is a market need for a attachment device that carries torsional stresses away from the trailer hitch receiver tube and the chassis of the vehicle.

SUMMARY OF THE INVENTION

In the present mounting of implement to the rear end of an utility terrain vehicle, the attachment device to which the implement is attached is connected to the trailer hitch tube of the vehicle and also to the suspension posts and pivots of the upper and lower control arms of the rear wheels of the vehicle. Torsion stresses applied to the trailer hitch tube is partly absorbed by the rear wheels of the vehicle. Torsion stresses is readily transmitted to the suspension of the vehicle and translated as a rolling of the vehicle. A degree of rolling is an indication of the severity of the stress and dictates a lessening or curtailing of the operation in progress.

In a first aspect of the present attachment device, consideration is given to a combination of a utility terrain vehicle having a chassis, an independent suspension, a pair of rear suspension posts integrated into the chassis, and a trailer hitch receiver tube mounted to the chassis between the suspension posts; and an attachment device mounted to the utility terrain vehicle for supporting working accessories to the utility terrain vehicle. The attachment device has a saddle formed therein straddling the trailer hitch receiver tube and a pair of adapter brackets mounted thereto on respective side of the saddle. The attachment device reinforces the connection of the hitch receiver tube to the chassis of the vehicle. A torsion stress applied to the attachment device is bypassed over the hitch receiver tube and is entirely transmitted to the suspension of the vehicle without applying any torsion stress to the hitch receiver tube or to the chassis of the vehicle.

Of course, if the torsion stress overtakes the capacity of the suspension system of the vehicle and tips over the vehicle, some stress will be applied to the chassis of the vehicle. Therefore, the expressions used herein are relative to stresses that are within the capacity of the suspension system of the vehicle.

In another aspect, there is provided an attachment device for mounting to an utility terrain vehicle and for supporting a working accessory or implement to the utility terrain vehicle. This attachment device comprises a base member and spaced apart riser plates extending upward from the base member. The base member has a saddle formed therein and being configured for straddling a common hitch receiver tube, and each of the riser plates comprising an adapter bracket mounted thereto. The adapter brackets have respective attachment surfaces, extending in a same plane, and respective pair of spaced-apart bolt holes therein. The bolts holes in the adapter bracket define a trapezoidal attachment formation, wherein the saddle is enclosed inside the trapezoidal formation. Because the saddle is included inside the trapezoidal formation, the attachment surfaces on the adapter brackets absorb stresses before these stresses are passed on to the saddle.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the attachment device for mounting accessories to utility terrain vehicles according to the present invention is described with the aid of the accompanying drawings, in which like numerals denote like parts throughout the several views.

The drawings presented herein are presented for convenience to explain the functions of all the elements included in the preferred embodiment of the present invention. Elements and details that are obvious to the person skilled in the art may not have been illustrated. Conceptual sketches have been used to illustrate elements that would be readily understood in the light of the present disclosure. These drawings are not fabrication drawings, and should not be scaled.

The utility terrain vehicle (UTV) illustrated in the drawings is a Kawasaki™, machine, model: Mule Pro-FXT™ with an independent rear suspension. The machine illustrated herein should not constitute a limitation in the application of the present attachment device or in any of the accessories described herein. The present attachment device is mountable to other UTV with independent suspension with or without minor modification. The present attachment device and associated accessories can be also mounted to the trailer hitch tube of an UTV having a solid rear axle, without some of the benefits claimed herein.

DESCRIPTION OF THE PREFERRED EMBODIMENT

Figure 1:
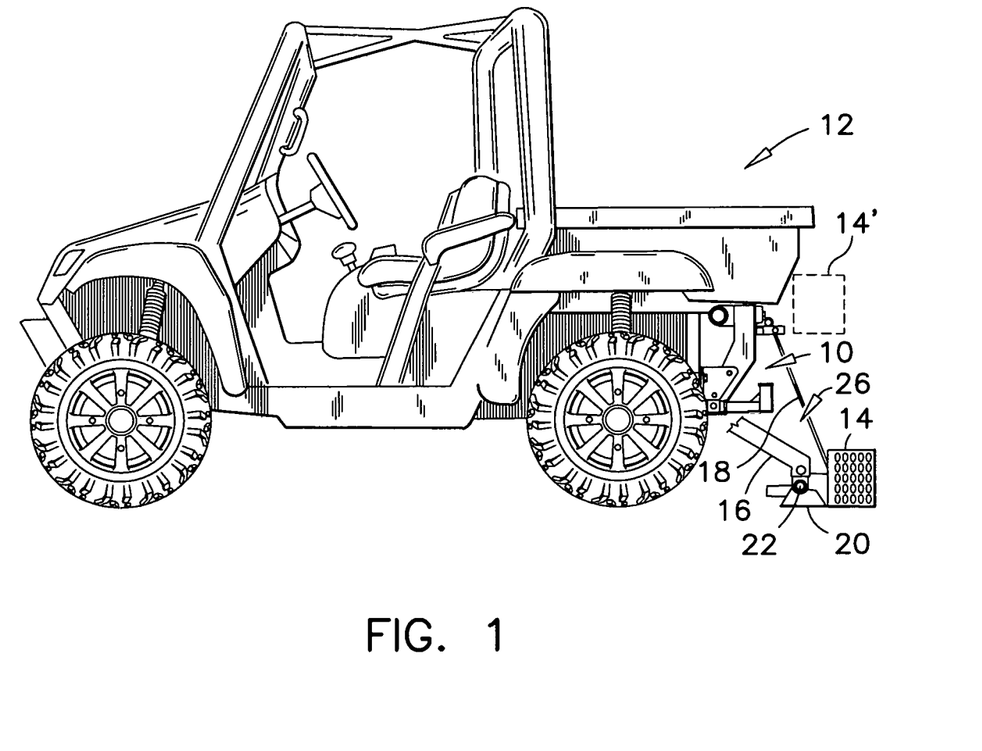
FIG. 1 is a side view of an UTV with the preferred attachment device and a scrapper blade mounted thereto, wherein the scraper blade is illustrated in use position in solid lines, and in a bumper mode position in dashed lines.

In order to expeditiously illustrate the advantages of the attachment device 10 according to the present invention, the UTV 12 described and illustrated in FIG. 1 has an attachment device 10 mounted thereto and a scraper blade 14 accessory mounted to the attachment device 10. This scraper blade 14 is held as a bumper 14' when not used for grooming trails. The scraper blade 14 is pivoted on arms 16, and operated by a winch cable 18 from a lower position to a higher position. In the lower position, the scraper blade 14 is supported directly on the soil. A pair of abrasion-resistant skid pads 20 are mounted on the forward side of the scraper blade 14 to gauge the depth of attack of the scraper blade 14. This scraper blade 14 is made of a piece of structural steel channel section.

The blade 14 is connected to the arms 16 on spherical-type rod-end bearings 22 such that each end of the blade 14 can float up and down on the ground independently of the other, and apply no torsion stress on the rear end of the UTV.

The arms 16 of the blade 14 are pivoted to the attachment device 10. The cable 18 used to raise and lower the blade 14 is worked by a winch 24 that is mounted to the upper portion of the attachment device 10.

The scraper blade 14 including the arms 16 are referred to herein as a first scraper blade accessory 26 mountable to the preferred attachment device 10.

Figure 2:
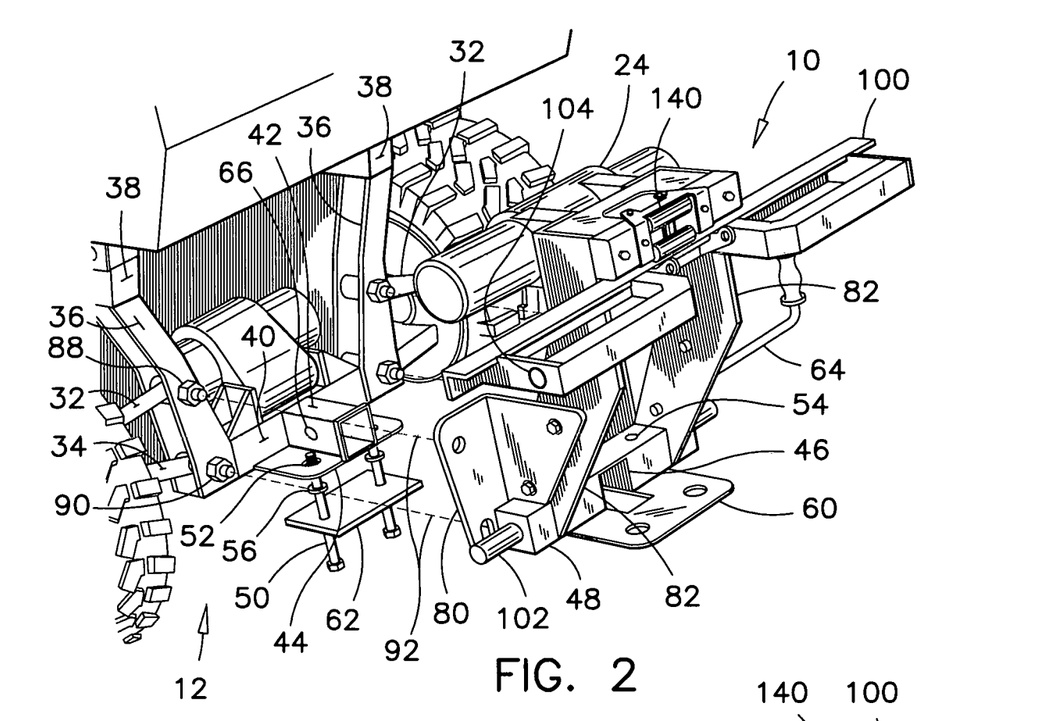
FIG. 2 is a perspective side and rear view of the preferred attachment device being mounted to the rear end of an UTV.
Figures 3, 4:
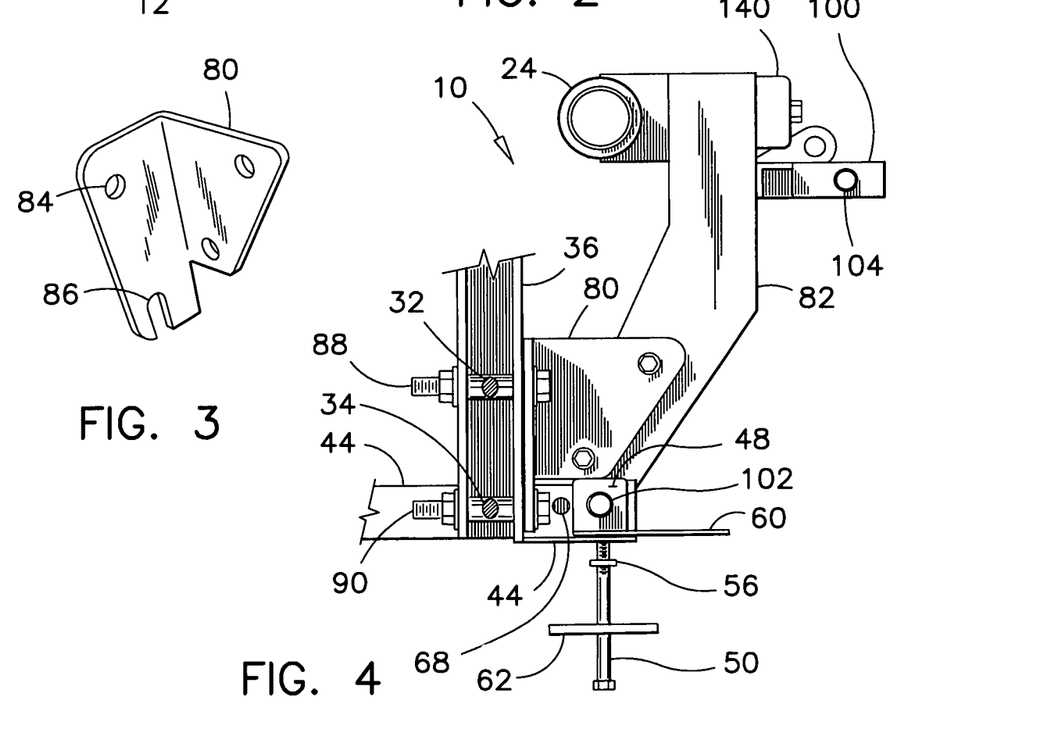
FIG. 3 is a perspective view of one of the adapter brackets that is used for retaining the attachment device to the suspension framing posts of the UTV.
FIG. 4 is a partial side view of the attachment device mounted to the one of the suspension framing post.

Referring to FIGS. 2-4, the structure and mounting of the attachment device 10 to the rear end of the UTV will be explained.

The UTV 12 has an independent suspension, where the upper control arms 32 and the lower control arms 34 of both rear wheels are pivoted to two suspension posts 36. These suspension posts 36 extend vertically between the upper structure 38 are the lower structure 40 of the chassis of the UTV, and form with the upper and lower structures 38, 40, a box-like frame that has substantial resistance to torsion and other stresses.

The trailer hitch receiver tube 42 extends from the lower structure 40 a certain length as is customary with all trailer hitch receiver tubes. Also as is customary with the trailer hitch, the hitch receiver tube 42 has a safety chain hooking plate 44 thereunder to hook the safety chains of a trailer hitch coupler (not shown).

The attachment device 10 has a saddle-like opening 46 in the base member 48 thereof, to precisely straddle the trailer hitch receiver tube 42. This saddle-like opening 46 is also referred to herein as a saddle 46.

A pair of bolts 50 extends from underneath the safety chain plate 44 and through both holes 52 of the safety chain plate 44. These bolts 50 extend through holes in the base member 48, one of which holes can be seen at label 54, to secure the attachment device 10 to the hitch receiver tube 42.

The bolts 50 are equipped with a respective disc 56. Each disc 56 has dimensions for a precise fit into one of the holes 52 of the safety chain plate 44 of the hitch receiver tube 42. By mounting the bolts 50 and the discs 56 in the safety chain plate 44, the attachment device 10 is fitly fastened to the hitch receiver tube 42.

The discs 56 keep the bolts 50 perfectly centred into the holes 52 in the original safety chain plate 44. It should be understood that the holes 54 extend through the base member 48 and through the auxiliary safety chain plate 60 of the attachment device 10. By mounting the discs 56 and bolts 50 to the safety chain plate 44, the auxiliary safety chain plate 60 on the attachment device 10 is solidly anchored to the original safety chain plate 44. Any load on this auxiliary safety chain plate 60, from hitch coupler chains attached thereto for example, is transmitted directly to the trailer hitch structure 40 of the UTV.

A flat plate 62 keeps both bolts 50 in a correctly spaced relationship, and keep the auxiliary safety chain plate 60 tight against the original safety chain plate 44, as can be understood from FIG. 4.

It will be appreciated that the mounting of the attachment device 10 to the trailer hitch tube 42 of the UTV, in such a straddling manner, does not prevent the mounting of a common hitch bar to the hitch receiver tube 42, so that a trailer can still be hitched to the UTV and towed normally.

In addition to the saddle 46 straddling the hitch tube 42, and bolts 50 and discs 56 fastening the original safety chain plate 44 to the auxiliary safety chain plate 60, the attachment device 10 is retained to the hitch tube 42 by a third retention point. A linchpin 64 extends through corresponding holes 66 in the hitch receiver tube 42 and through holes 68 in gussets extending forward of the base member 48 as can be seen in FIG. 4. The operation and function of the linchpin 64 is the same as other linchpins on common trailer hitches.

Concerning the mounting of the attachment device 10 to the frame of the UTV, there is a fourth and more important retention mechanism that is described as follows. A pair of angled adapter brackets 80 are removably attached to a pair of vertical riser plates 82 extending upward from the base member 48 on the attachment device 10. Each of these angled adapter brackets 80 has a hole 84 and a slot 86 therein facing forward. The hole 84 and slot 86 have size and spacing to mount to the pivot axes 88 and 90 of the upper control arm 32 and the lower control arm 34 respectively, of one of the rear wheels. Such mounting can be better understood by considering the dashed lines 92 in FIG. 2. It will be appreciated that the attachment of the adapter brackets 80 to the suspension posts 36 is defined by a planar trapezoidal attachment formation defined by the control arm pivot bolts 88, 90, wherein the saddle 46 is comprises inside that planar trapezoidal formation.

In some model of UTVs, the bolts of these axes may be replaced by slightly longer bolts to accommodate the attachment of the adapter brackets 80 to the suspension posts 36 of the vehicle. The bolts on the axles 88, 90 of the UTV illustrated herein are long enough to accommodate the described installation.

In the preferred embodiment, the adapter brackets 80 are bolted to the riser plates 82 as illustrated. The size and spacing of hole 84 and slot 86 can be changed between one pair of brackets 80 to another, so that a standard attachment device 10 can be easily fitted to different makes and models of UTVs.

The mounting of the attachment device 10 to the suspension posts 36 using the adapter brackets 80 as described, constitute the major attachment arrangement. Any stress on the attachment device 10 is transmitted to the chassis of the UTV, distributing the load evenly around that box-like frame 36-38-40. Concentrated loading on the chassis of the UTV is thereby prevented. Furthermore, any torsion stress along the longitudinal axis of the UTV is readily transmitted to the suspension and to the wheels of the UTV.

Because of the nature of these machines, the chassis thereof is made to absorb relatively hard shocks and stresses from the wheels. Therefore, the box-like structure defined by the suspension posts 36 and frame members 38 and 40 of an UTV constitutes the stronger portion of the machine. Any torsion stress on the attachment device 10 is transmitted directly to and absorbed by the suspension system, without adverse effect on the hitch receiver tube 42 and on the lower structure 40 of the vehicle. A torsion stress on the attachment device 10 is transferred to the suspension posts 36, and converted into a rolling of the vehicle. The degree of rolling is directly related to the severity of the stress. This degree of rolling is a good indication to the user of the related accessory, of the stress being applied to the vehicle by the current operation. The degree of rolling is also a good indication to inform the user of the related accessory to carry on or to stop the current operation.

Referring again to FIG. 2, the attachment device 10 has a cross-arm 100 on its upper portion, and stub shafts 102 extending laterally from each end of the base member 48. The arms 16 of the scraper blade 14 are pivoted to the stub shafts 102. The arms 16 are retained in the upper position by linchpins (shown later) fitted into the holes 104 of the cross arm 100 when the scraper blade 14 is in the raised position and used as a bumper 14'.

Figures 5, 6:
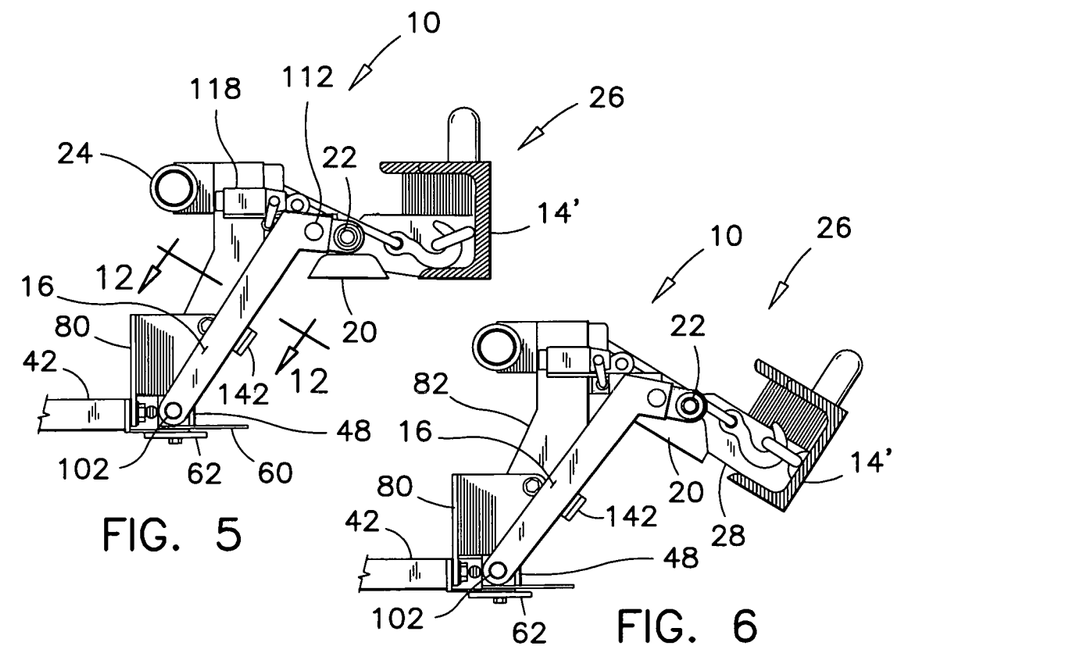
FIG. 5 is a partial side view of the attachment device with the scraper blade mounted thereto in the bumper mode position.
FIGS. 6 and 7 illustrate partial views of the attachment device with the scraper blade in a first and second intermediate positions respectively between a bumper position and an in use scraping position.
Figures 7, 8:
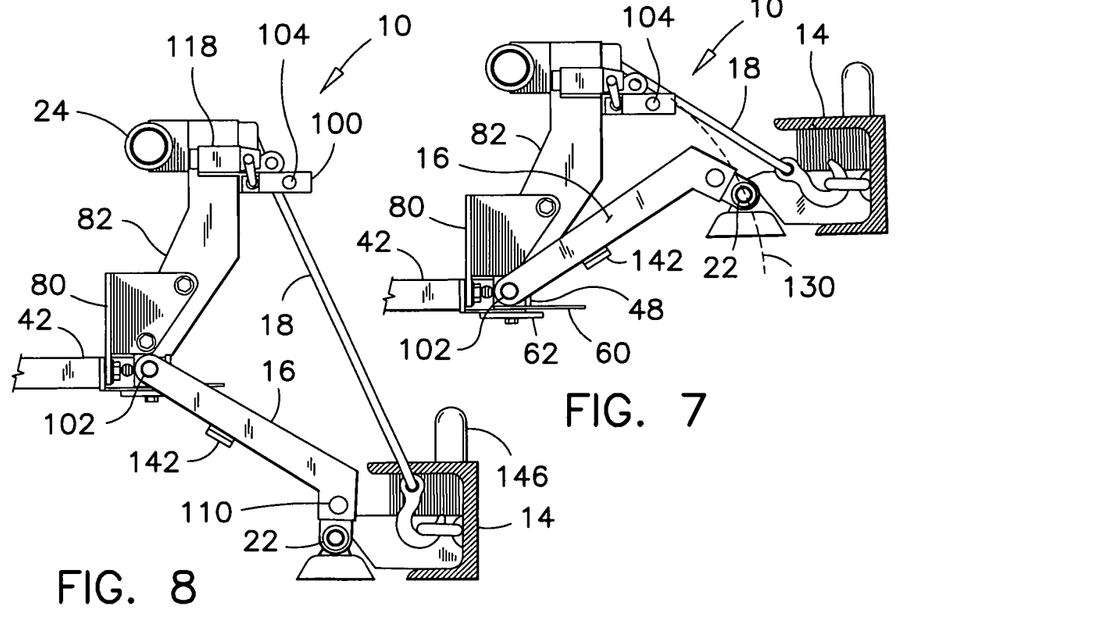
FIG. 8 illustrates a partial side view of the attachment device with the scraper blade mounted thereto in an in-use, scraping position.
Figure 9:
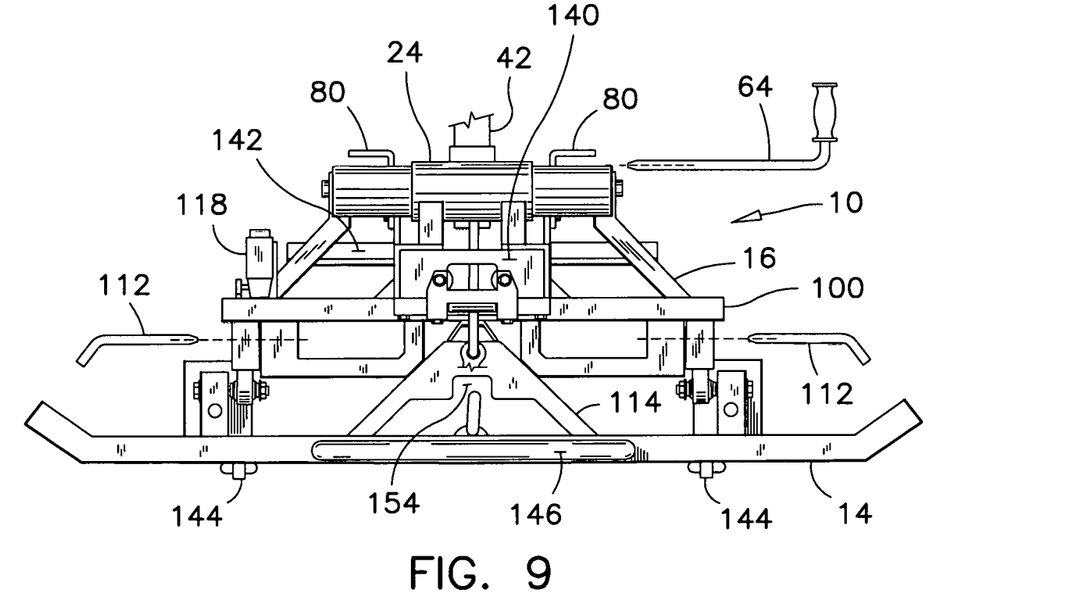
FIG. 9 is a top view of the attachment device and scraper blade, with the scraper blade in the upper, bumper position.
Figure 10:
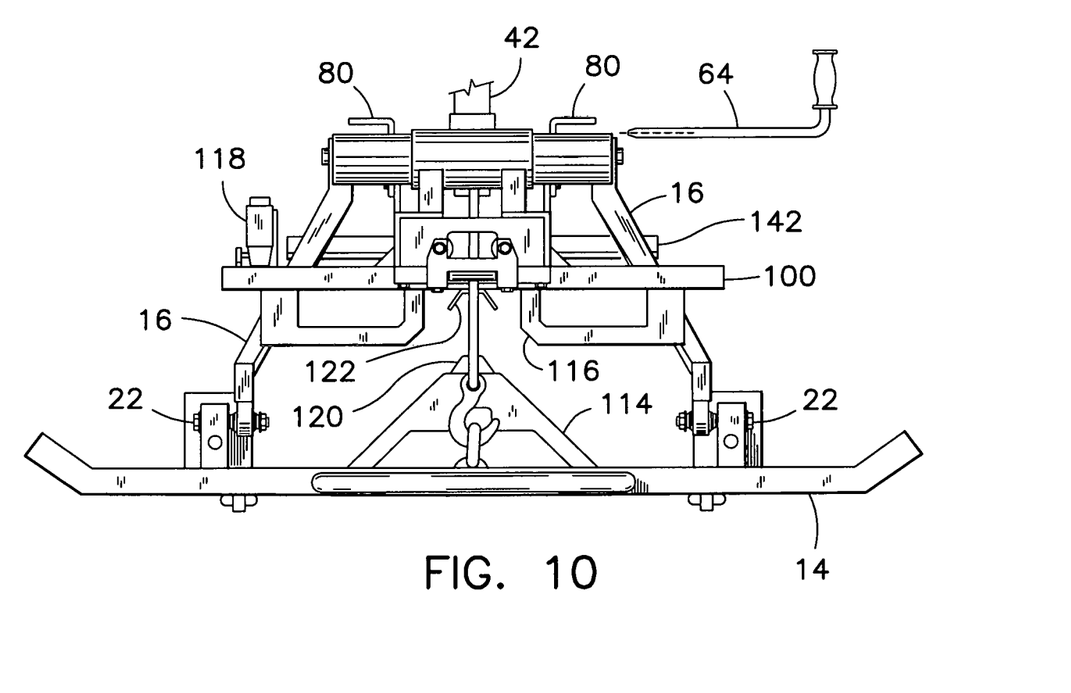
FIG. 10 is a top view of the attachment device and scraper blade with the scraper blade in a lower, in-use position.
Figure 11:
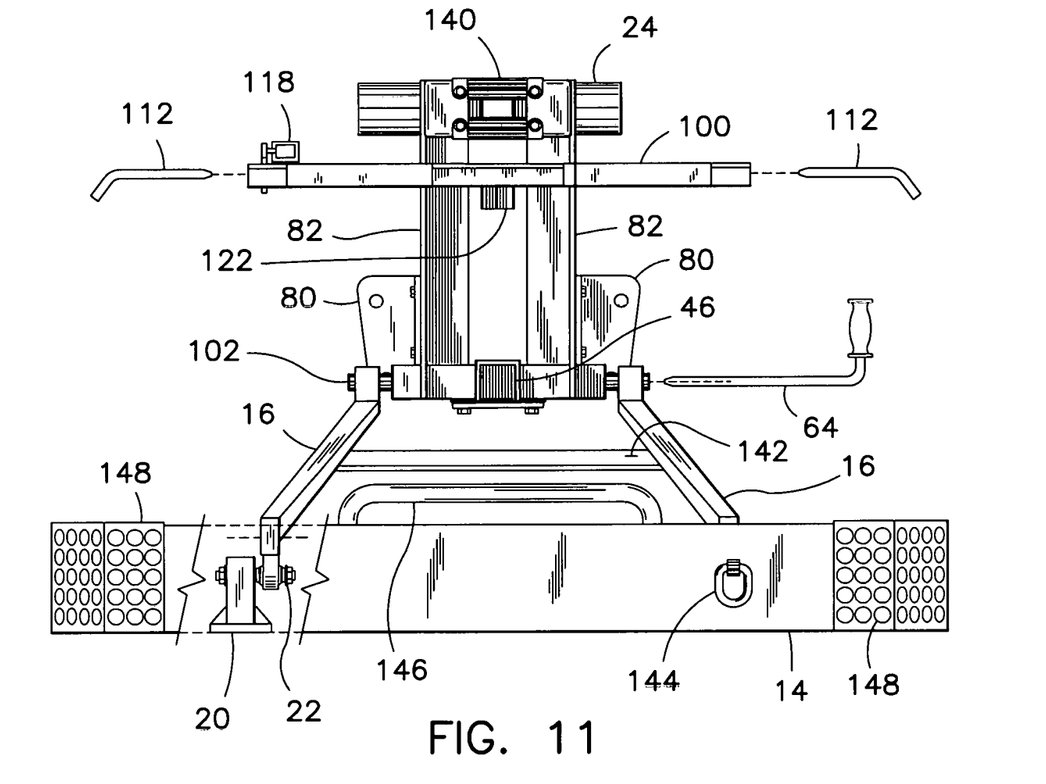
FIG. 11 is a partial rear view of the attachment device and scraper blade with the scraper blade in an in-use scraping position.

Referring now to FIGS. 5 to 8, there are illustrated therein, side views of the scraper/bumper system 26 with the scraper blade 14 being moved from a stowed/bumper mode in FIG. 5, to a deployed scraper mode in FIG. 8. In FIGS. 9 and 10, there are illustrated top views of the scraper/bumper system 26 in stowed/bumper position and with the bumper 14' partly moved from the stowed/bumper position, respectively. In FIG. 11 there is illustrated a rear view of the scraper/bumper system 26 in a deployed/scraper mode. Reference to these figures will be made simultaneously to explain the different elements of the scraper/bumper system 26, and their functions.

As previously explained, the attachment device 10 embraces the hitch receiver tube 42. A pair of riser plates 82 extend upward from the base member 48. The pair of arms 16 are pivoted to stub shafts 102 extending from the bottom of the attachment device 10. The arms 16 are also pivoted, at their other ends, to the pair of skid pads 20 of the scraper blade, by means of rod-end type spherical bearings 22.

The skid pads 20 are firmly connected by flat bars 28 to the scraper blade 14. It will be appreciated that when the arms 16 are moved, the scraper blade 14 also moves. In use, the arms 16 are independently supported on the attachment device 10 and on the skid pads 20. The spherical-type bearings 22 do not restrict the up and down movement of the scraper blade 14. Because of these spherical bearings 22, the scraper blade 14 can tilt sideways and follow the trail surface being groomed.

The riser plates 82 are welded to the base member 48 of the attachment device 10. The riser plates 82 support the cross-arm 100 at their upper ends. This cross-arm 100 has two purposes. It's first purpose is to retain the arms 16 in a stowed/bumper mode. A pair of holes 110 in the arms 16 register with the similar size holes 104 in the ends of the cross-arm 100, when the arms 16 are in the raised position. The arms 16 are held to the cross-arm 100 by means of a pair of linchpins 112 such as those illustrated in FIGS. 9 and 11.

The second purpose of the cross-arm 100 is to keep the bumper 14' centred with the UTV when the bumper 14' is in a stowed/bumper mode. The scraper blade 14 has a centring A-frame 114 extending from a front end thereof. This centring A-frame 114 aligns with a pair of chamfers 116 on the cross arm 100, when the scraper/bumper system 26 is in a stowed/bumper mode, has can be appreciated from FIGS. 9 and 10. The centring A-frame 114 and chamfers 116 combination keeps the bumper 14' from moving sideway when the scraper/bumper system 26 is in a stowed/bumper position. A limit switch 118 is preferably provided on the cross-arm 100, to automatically stop the winch 24 when the bumper 14' is in the stowed mode.

The A-frame 114 also has a centring finger 120 extending from the apex thereof. This centring finger 120 aligns with, and registers into a funnel-like cavity 122 under the cross-arm 100, as can be seen in FIGS. 9, 10, and 11 to further keep the bumper 14' from moving sideway when the scraper/bumper system 26 is in a stowed/bumper mode.

Referring back to FIGS. 6 and 7, the scraper blade 14 is heavier than the combined weight of both arms 16, and the centre of gravity of the blade 14 and arms 16 combination is on the blade side of both bearings 22. When the blade 14 is being raised, and the arcuate path 130 of the common axis of both bearings 22 approaches the line of pull of the cable 18, as shown in FIG. 7, the weight of the grader blade 14, makes it tilt backward as shown in FIG. 6 to facilitate the alignment of the centring finger 120 and the A-frame 114 into the funnel-like cavity 122 and in the chamfers 116, respectively. The centring finger 120 registering the funnel-like cavity 122 and the pull of the cable 18 bring the blade 14 back into a horizontal bumper-like position as shown in FIG. 5.

A cable-guide box 140 is provided on the cross-arm 100. This cable-guide box 140 contains a series of horizontal and vertical rollers to guide the winch cable 18 without abrading it.

Figure 12:
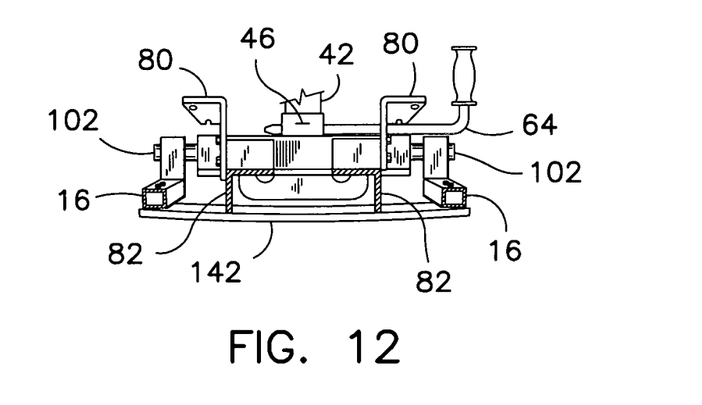
FIG. 12 is a partial top view of the arms and the leaf spring of the scraper blade when the blade is in an upper position, as seen along line 12-12 in FIG. 5.

A leaf spring 142 is mounted across both arms 16. This leaf spring 142 is made of a flat bar of Teflon™ or other similar flexible material. When the scraper/bumper system 26 is moved to a stowed/bumper mode, the arms 16 are brought up by the winch 24, and the leaf spring 142 is forced against the edges of both riser plates 82, thereby flexing the leaf spring 142 slightly, as can be seen in FIG. 12. The leaf spring 142 takes away any looseness in the arms 16. This leaf spring 142 prevents the arms 16 from rattling when the scraper/bumper system 26 is in a bumper mode.

Referring back to FIG. 11, a pair of D-rings 144 may be provided for convenience, on the rear surface of the grader blade 14, and a rail 146 may also be provided for the same reason on the top edge of the blade 14. Reflector pads 148 are preferably provided on both ends of the scraper blade 14 as a safety feature when the scraper/bumper system 26 is in a bumper mode.

The winch 24 is preferable operated electrically, remotely or from the dashboard of the UTV.

Figures 13, 14:
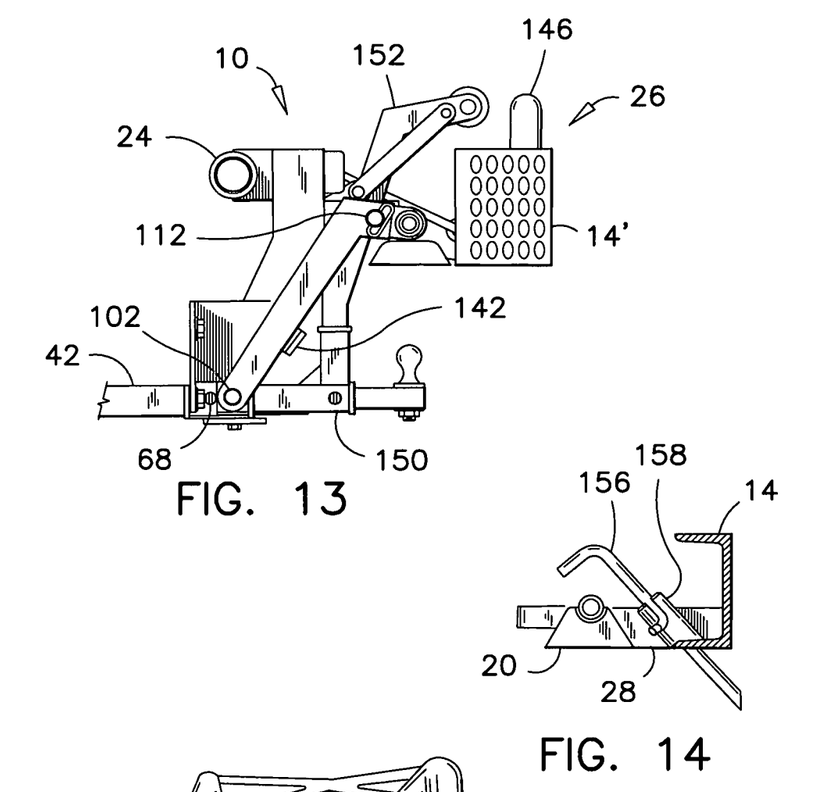
FIG. 13 is a partial side view of the attachment device with a crane arm accessory mounted to the attachment device.
FIG. 14 is a side view of a reverse anchor peg accessory mounted to the preferred scraper blade.

When the scraper/bumper system 26 is in a stowed/bumper mode as shown in FIG. 13, a hitch extension 150 can be installed in the hitch receiver tube 42, to support a crane mast 152 for example. A U-shaped guide 154 has been incorporated in the A-frame 114 as seen in FIG. 9 to guide the crane mast 152 in the hitch extension 150. It will be appreciated that the crane mast 152 is an optional accessory and it is not required for the operation of the scraper/bumper system 26.

It should be noted that the pins 112 do not have to be installed every time the bumper 14' is raised up. The winch has sufficient braking strength to hold the bumper 14' in place. The scraper blade 14 can be lowered and raised as needed without stopping the vehicle 12. For this purpose, the winch 24 is preferably operated from a toggle switch with visual indicators on the dashboard of the vehicle.

Figure 15:
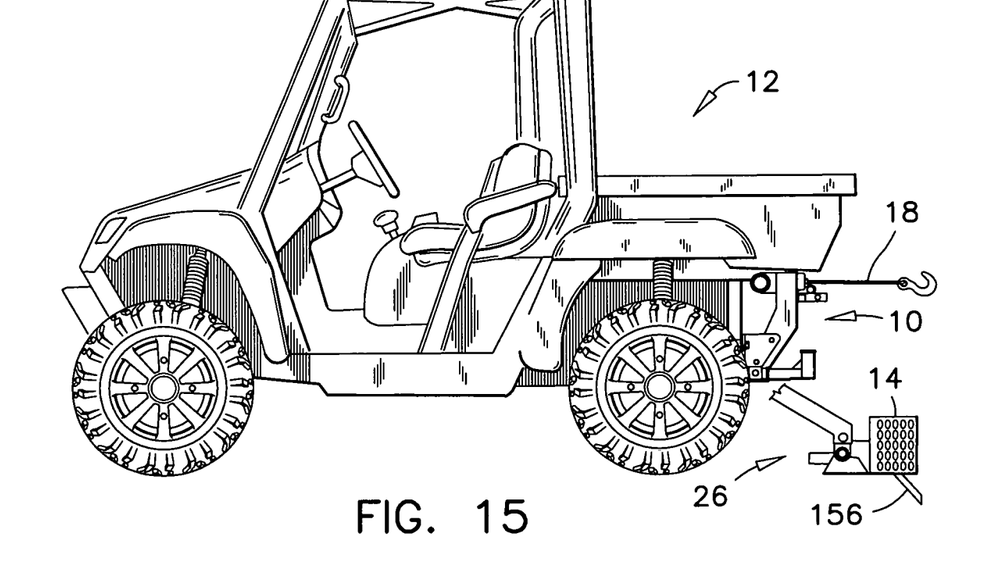
FIG. 15 is a side view of an UTV with the preferred scraper blade and the reverse anchor peg extended.

Referring to FIGS. 14 and 15, a pair of removable reverse-anchor pegs 156 are preferably provided with the scraper/bumper system 26. These optional reverse-anchor pegs 156 are useful to anchor the vehicle 12, for pulling another vehicle up a slippery hill for example, or out of a ditch. The reverse-anchor pegs 156 are installed when needed in a pair of tubular fittings 158 respectively welded to the flat bars 28 extending between the skid pads 20 and the scraper blade 14. As can be appreciated, each peg 156 extends through a hole (not shown) through the bottom flange of the scraper blade 14. When the reverse-anchor pegs 156 are extended, the UTV is backed up to push the pegs 156 firmly into the ground. Then, the cable 18 of the winch can be unwind to reach the vehicle needing assistance.

Figure 16:
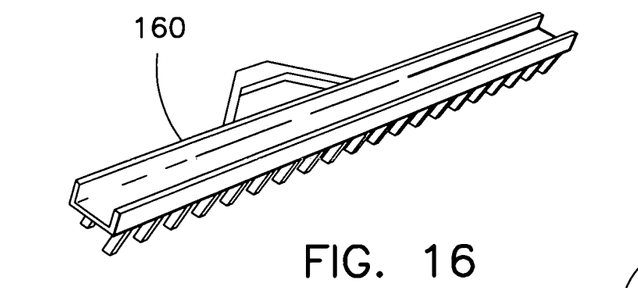
FIG. 16 is a perspective view of a finger harrow accessory that can be mounted to the preferred attachment device as an alternative to the preferred scraper blade.

Referring now to FIG. 16, there is illustrated therein, a finger harrow 160. This harrow 160 is another accessory that can be use as an alternate accessory to the scraper blade 14 described earlier. The mounting of the finger harrow 160 to the attachment device 10 is a same structure and mechanism as for the scraper blade 14 and therefor this mounting is not described further.

Figures 17, 18:
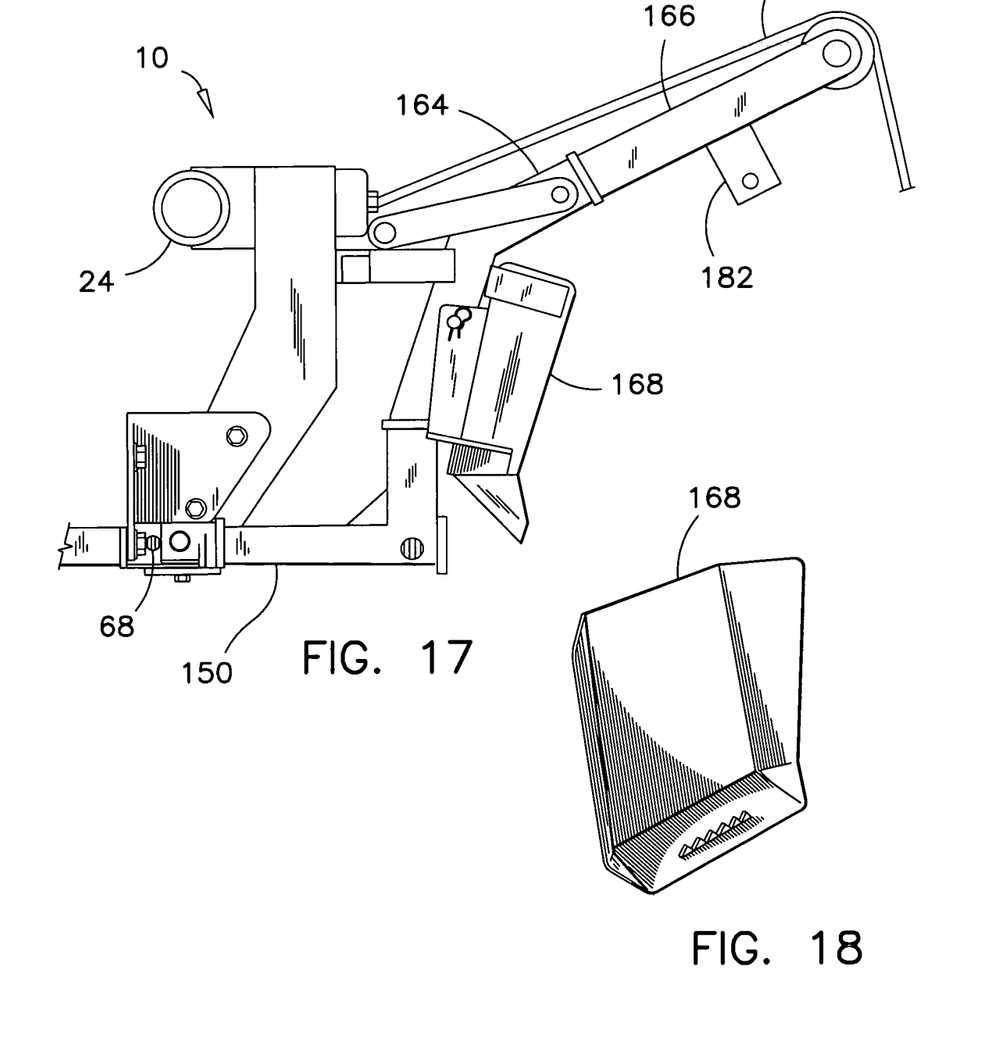
FIG. 17 illustrate a logging boom with a first jib boom and log end guard accessories that can be mounted to the preferred attachment device.
FIG. 18 is a perspective side and rear view of the log end guard shown in FIG. 17.

FIGS. 17 and 18 illustrate a logging boom 164 mounted to the hitch tube extension 150 and to the attachment device 10. A log end guard 168 is mounted to the crane boom 164 to protect the attachment device 10, when these accessories are mounted to the attachment device 10. The logging boom 164 preferably has a first jib boom 166 removably mounted thereto.

Figures 19, 20:
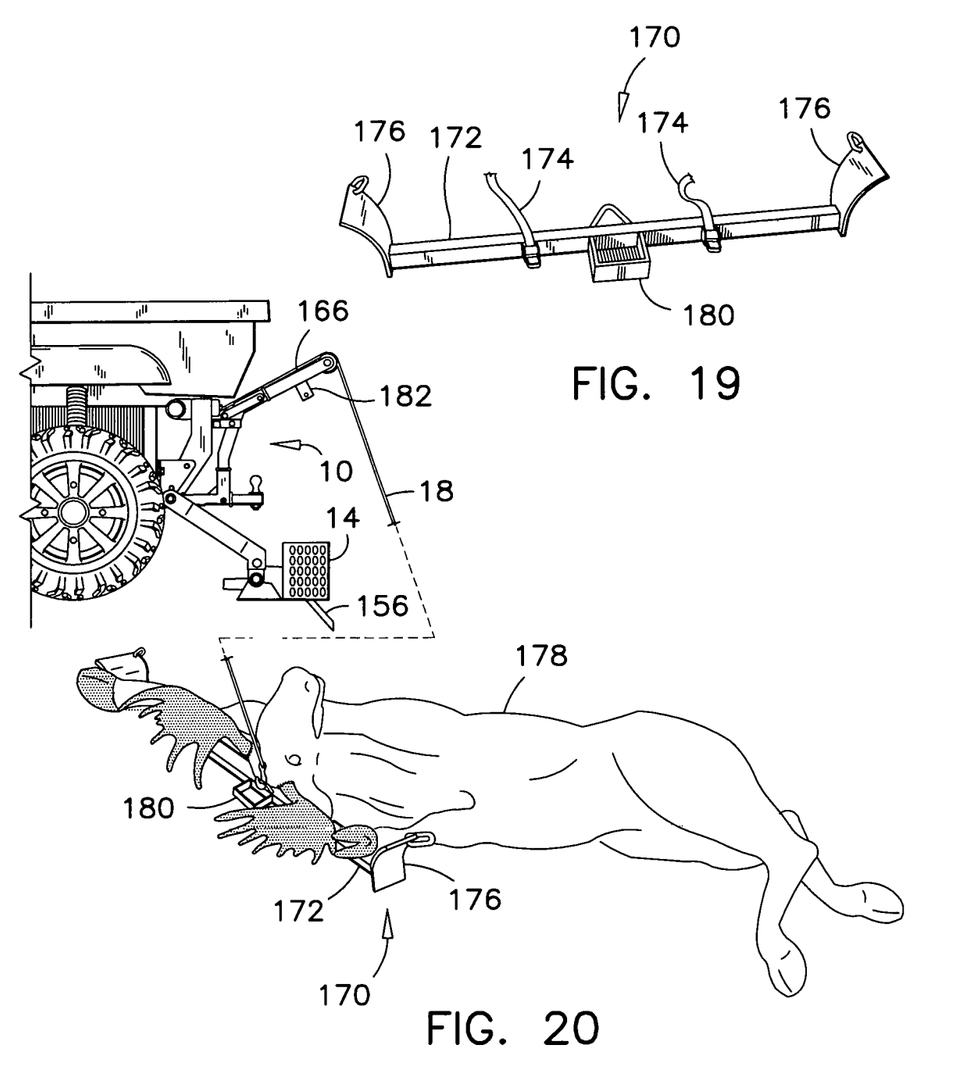
FIG. 19 is a perspective view of a moose pulling yoke accessory that is usable with the logging boom accessory to pull a moose, for example, close to the UTV.
FIG. 20 illustrates the use of the yoke of FIG. 19, for pulling a moose close to the UTV.

In FIGS. 19 and 20, the logging crane boom 164 is used with a moose pulling yoke 170 accessory. This yoke accessory 170 comprises an elongated beam 172 that is slightly longer than the average width of a moose panache. The beam 172 has a pair of straps and tighteners 174 mounted thereto to hold a moose panache tight against the beam 172. A deflector wing 176 is provided at each end of the beam 172 to facilitate the attachment of the forward legs of a game animal to the beam 172. A pocket 180 is also provided along a centre portion of the beam 172. This pocket 180 has dimensions for registering with a corresponding stem 182 extending under the upper segment of the first jib boom 166. When the pocket 180 is registered with the stem 182 and locked to the stem 182 by a linchpin (not shown) for example, the game animal is easily pulled through the wood, to a camp site, for example.

Figure 21:
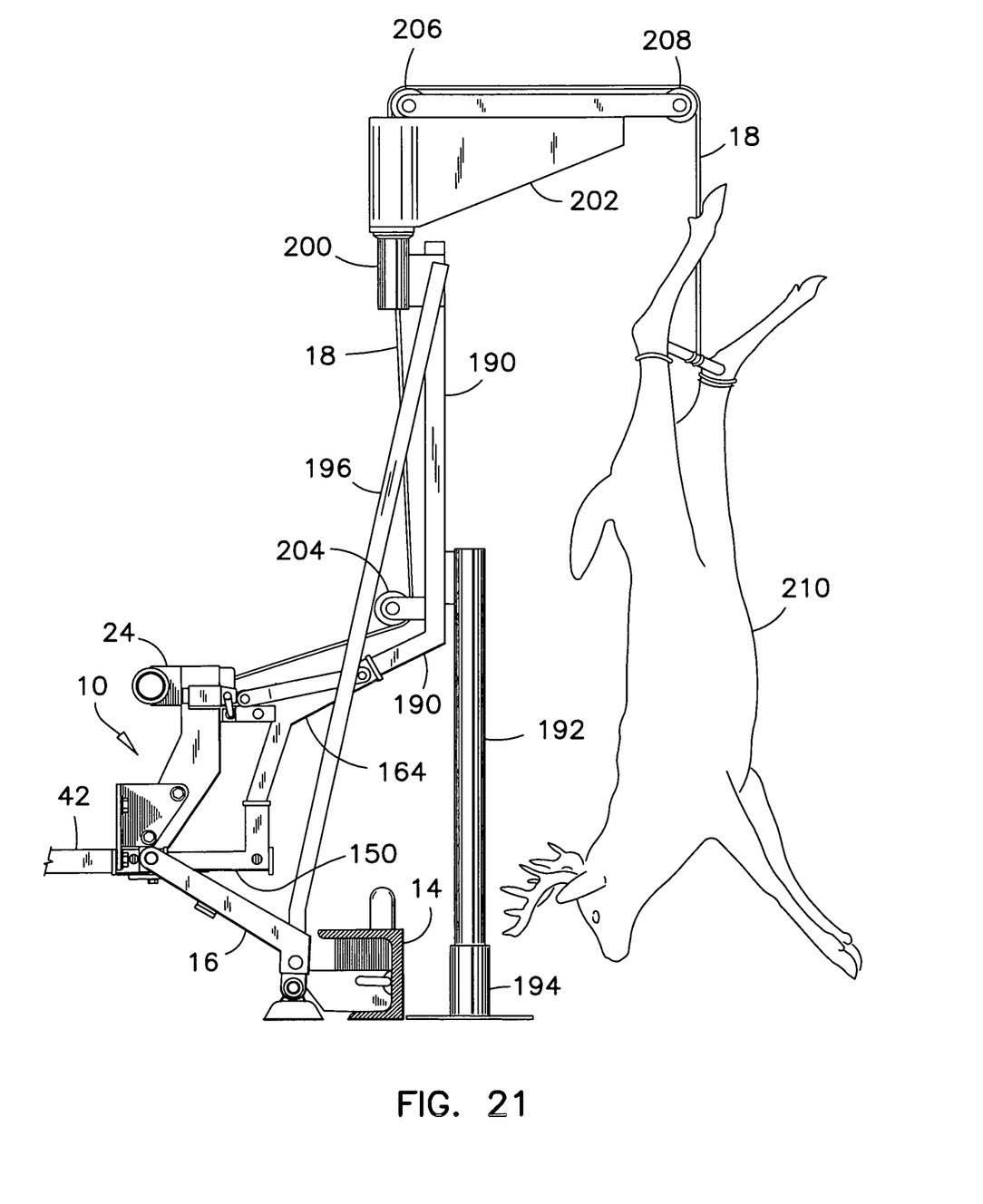
FIG. 21 illustrates a jib crane accessory that is steadied to the preferred attachment device and which can be used to suspend and dress a game animal.
Figure 22:
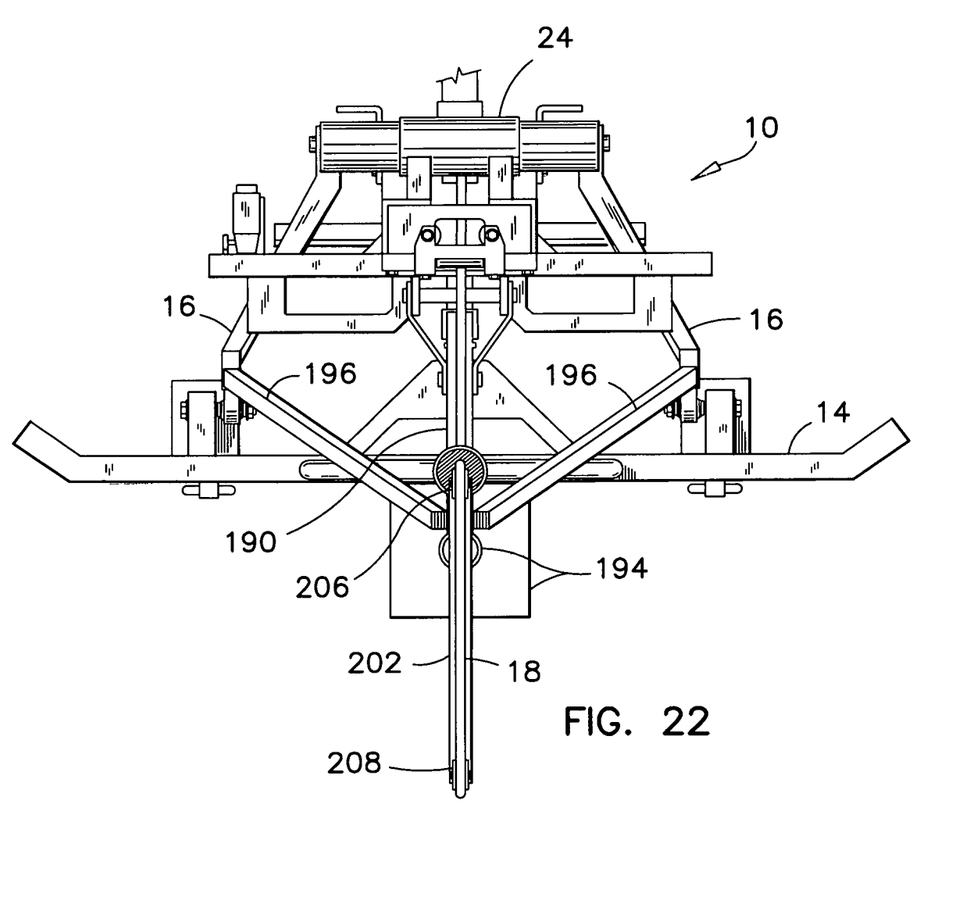
FIG. 22 is a top view of the jib crane accessory shown in FIG. 21.

Another hunting accessory is illustrated in FIGS. 21 and 22. In this accessory, the first jib boom 166 mentioned before is removed from the logging boom 164 and replaced by a vertical tower mast 190. This tower mast 190 is braced on one side to a vertical post 192 seated in a pedestal 194. The tower mast 190 is braced on the other side by a pair of elongated members 196 seated into a respective socket (not shown), in the arms 16 of the grader blade 14. A sleeve-type pivot 200 is provided on the upper segment of the tower mast 190, and a second jib boom 202 is mounted to this pivot 200.

In this accessory, the cable 18 of the winch 24 is routed around a first pulley 204 on the tower mast 190, along the mast and into the sleeve-type pivot 200. This cable 18 is deviated on a first and second top pulleys 206, 208 on the second jib boom 202. The cable 18 hangs down in a vertical usable manner, to support a deer 210 for example, as illustrated in FIG. 21. This jig-crane accessory is very sturdy as it is anchored to the attachment device 10 and uses the entire weight of the UTV as a ballast.

Figure 23:
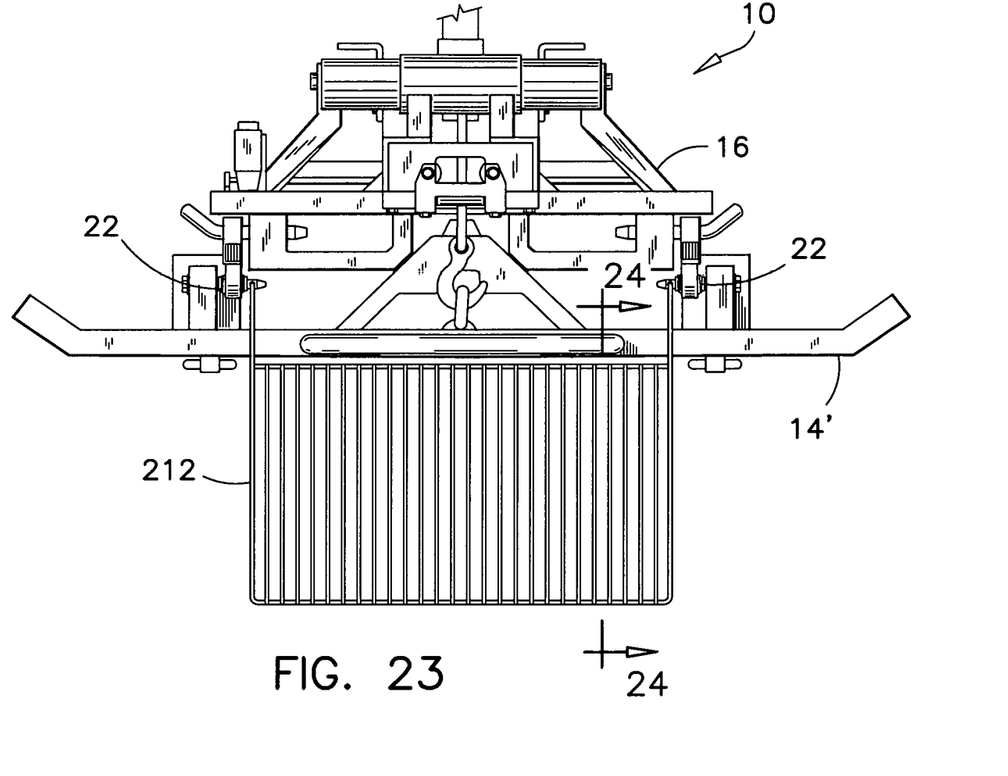
FIG. 23 is a top view of the scrapper blade in the upper position with a table accessory mounted thereto.
Figure 24:
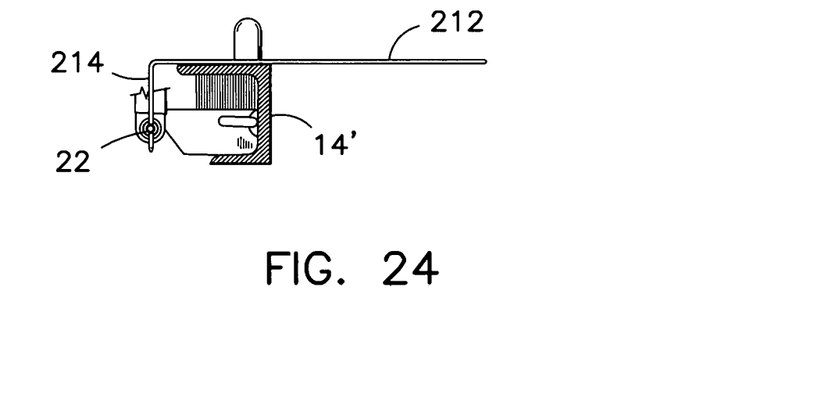
FIG. 24 is a cross-section view of the table accessory illustrated in FIG. 23, as seen along line 24-24 in FIG. 23.

There is yet another accessory that is mountable to the scraper/bumper system 26 with the scraper blade 14' in a bumper mode. This accessory, as it is illustrated in FIGS. 23 and 24 consists of a table 212 which overhang the bumper 14' and which can be used for displaying a map, a book, or for supporting a lunch or coffee cups for examples. The table 212 has two fingers 214 that extend into respective holes on the scraper/bumper system 26. In the present system, these fingers 214 extend through linchpin holes through the ends of the shafts of the bearings 22, with their respective linchpins removed. Other sockets may be provided into other parts of the scraper/bumper system 26 to support this table 212 in a same way as just described.

As can be appreciated, the present attachment device 10 may be mounted to other machines other than an UTV, and offer the same benefits as those described herein. Similarly, other analogous accessories may be used in a same way as explained herein. Therefore, the vehicle described herein and the illustrated accessories should not be considered as a limitation to the present invention.

What is claimed is:

1. In combination, a utility terrain vehicle having a chassis, an independent suspension, a pair of rear suspension posts integrated into said chassis and into said independent suspension, and a trailer hitch receiver tube mounted to said chassis between said suspension posts; and an attachment device mounted to said utility terrain vehicle configured for mounting working accessories to said utility terrain vehicle; said attachment device having a saddle formed therein straddling said trailer hitch receiver tube and a pair of adapter brackets mounted thereto on respective side of said saddle and being connected to said suspension posts such that any torsion stress on said attachment device is transmitted to said independent suspension.

2. The combination as claimed in claim 1, wherein each of said suspension posts comprises an upper control arm pivot bolt extending there through and a lower control arm pivot bolt extending there through, and said adapter brackets being connected to said upper control arm pivot bolts and to said lower control arm pivot bolts.

3. The combination as claimed in claim 1, wherein said attachment device has a scraper blade connected thereto, and a lifting mechanism being configured for raising said scraper blade into a bumper height and for aligning said scraper blade into a bumper position.

4. The combination as claimed in claim 3, wherein said lifting mechanism comprises a winch mounted to said attachment device.

5. The combination as claimed in claim 3, wherein said saddle is secured to said trailer hitch receiver tube by a pair of bolts fitted to said trailer hitch receiver tube.

6. The combination as claimed in claim 4, wherein said scraper blade comprises a pair of arms pivoted to said base member; each of said arms having rod-end bearings thereon, said rod-end bearings being pivoted to said scraper blade, wherein an alignment of a cable of said winch and a center of gravity of said scraper blade relative to positions said rod-end bearings are configured to tilt said scraper blade backward about said rod-end bearings when said scraper blade is being raised.

7. The combination as claimed in claim 6, wherein said scraper blade also comprises a flexible flat bar extending between said arms, and said flexible flat bar being configured for contacting, and for bending against portion of said attachment device when said scraper blade is in said bumper position.

8. The combination as claimed in claim 4, wherein said scraper blade also comprises reverse anchor pegs movably mounted thereto.

9. The combination as claimed in claim 2, wherein said attachment device comprises a logging crane boom and a first jib boom connected thereto.

10. The combination as claimed in claim 9, wherein said logging crane boom comprises a log end guard mounted thereto.

11. The combination as claimed in claim 9, wherein said logging crane boom has a stem extending therefrom and said accessory comprises a moose pulling yoke having a pocket formed thereon, and said pocket being mountable to said stem.

12. The combination as claimed in claim 3, wherein said attachment device has a tower mast connected thereto and a jib crane movably connected to said tower mast.

13. The combination as claimed in claim 12, wherein said tower mast is supported on one side thereof by a pedestal and on an other side thereof by a pair of elongated members extending from said scraper blade.

14. The combination as claimed in claim 3, wherein said scraper blade comprises a table removably mounted thereto.

15. An attachment device for attachment to an utility terrain vehicle and for supporting a working accessory to said utility terrain vehicle;
   comprising a base member and spaced apart riser plates extending upward from said base member; said base member having a saddle formed therein; said saddle being configured for straddling a hitch receiver tube on said utility terrain vehicle, and each of said riser plates comprising an adapter bracket mounted thereto; said adapter brackets having respective attachment surfaces, and a pair of spaced-apart bolt holes therein; said bolts holes in said adapter bracket defining a trapezoidal attachment formation, wherein said saddle is comprised inside said trapezoidal attachment formation and wherein each of said pair of spaced-apart bolt holes comprising a slot and a bolt hole spaced from said slot in said respective attachment surfaces and said slots being at a same elevation as said saddle.

16. The attachment device as claimed in claim 15, further comprising a winch mounted to the top of said riser plates.

17. The attachment device as claimed in claim 15, further comprising a pair of stub shaft extending along a same axis on each side of said base member.

18. The attachment device as claimed in claim 15, wherein said adapter brackets being removably mounted to said riser plates.

19. The attachment device as claimed in claim 15, wherein said saddle is retained to said hitch receiver tube by a linchpin extending through said hitch receiver tube.

20. The attachment device as claimed in claim 19, wherein said bolt hole in each of said adapter brackets being spaced above said slot in said attachment surface.

* * * * *